United States Patent

Windows, Jr.

[11] 4,120,228
[45] Oct. 17, 1978

[54] HAND HELD MOUTHPIECE VISUALIZER FOR INTERIOR EMBOUCHURE

[76] Inventor: Howard Windows, Jr., 23 Linden St., Natrona, Pa. 15065

[21] Appl. No.: 770,394

[22] Filed: Feb. 22, 1977

[51] Int. Cl.² ............................................. G09B 15/00
[52] U.S. Cl. ........................................ 84/453; 84/465
[58] Field of Search .......................... 84/398, 453, 465

[56] References Cited

U.S. PATENT DOCUMENTS

| | | | |
|---|---|---|---|
| 2,515,411 | 7/1950 | LaVelle | 84/398 |
| 3,293,976 | 12/1966 | Windows | 84/453 |
| 3,721,151 | 3/1973 | Dimond | 84/398 |

*Primary Examiner*—Lawrence R. Franklin
*Attorney, Agent, or Firm*—Parmelee, Miller, Welsh & Kratz

[57] ABSTRACT

The rim of a brass instrument mouthpiece is mounted in spaced relation to a body member having a reflective surface such that a brass player placing his or her lips against the mouthpiece rim may observe and thereby develop the interior embouchure as reflected in the reflective surface. An opaque planar guard may be secured around the rim or transparent mouthpiece to obscure the external embouchure and thereby focus the player's attention on the interior embouchure.

2 Claims, 4 Drawing Figures

HAND HELD MOUTHPIECE VISUALIZER FOR INTERIOR EMBOUCHURE

BACKGROUND OF THE INVENTION

1. Field of the Invention

This invention relates to a brass instrument hand held mouthpiece visualizer teaching aid designed for correcting playing faults in dealing with the interior embouchure of brass instrument players such as trumpet, trombone, French horn, tuba players and the like.

2. Prior Art

It is a known fact that in order for a brass player, beginner or advanced, to become successful, he or she must master the embouchure. The embouchure is the shaping of the lips, tongue and other organs in producing a musical tone on a wind instrument. The embouchure of a wind instrument player can be equated to the vocal cords of a vocalist and it is believed that the embouchure is one of the major factors in the proper production and control of tone and musical sound in a wind instrument. The embouchure must be developed through the proper use and development of the organs involved in playing a wind instrument. It has been found that each player of a wind instrument has a different embouchure and what may be proper or suitable for one individual may not be suitable for another.

I have found that a brass player's embouchure has two basic parts consisting of the interior and exterior sections. The exterior section of the brass player's embouchure consists of the organs and muscles that surround the mouthpiece rim after it has been placed on the player's lips. The interior section of the brass player's embouchure consists of all the organs and muscles that function on the inside of the brass mouthpiece after the mouthpiece has been positioned.

In order to appreciate the importance of the interior embouchure and of my invention, it will be useful to consider a few of the interior embouchure problems experienced by brass players. First, many brass players have the tendency to distort or jam the tone in both the middle and high brass registers due to pinching the lips too tightly together in the interior embouchure. This technique prevents the lips from vibrating freely and causes players to execute their instruments with unnecessary force. This in turn creates poor blood circulation through the lips, and can eventually cause permanent injury to the lip muscles that results in poor, fuzzy tonal qualities that may never be corrected. Since it is a known fact that brass musicians who hold responsible positions are selected primarily on the basis of the tonal quality of their playing, this interior embouchure fault can place a permanent limitation on a player's playing ability and opportunities.

Second, correct tonguing is very important to the player's interior embouchure and his performance ability. The tongue must not be pushed between the lips but rather the tip of the tongue should touch behind the upper front teeth. If the tongue does not function as mentioned and the student does not have the ability to overcome these tonguing deficiencies, good tonal attacks, which are necessary to articulate difficult tonguing passages, will not be developed.

A third common playing fault takes place when the lower lip of the interior embouchure slips behind the upper lip. This can be corrected by making sure that the upper and lower lips of the interior embouchure are exactly opposite each other. If the lower lip tends to slip behind the upper lip in the interior embouchure, the player should push the lower lip out to meet the upper lip by using the lower teeth and jaw. This will then allow the lips to vibrate properly.

A fourth playing fault of the interior embouchure concerns the aperture. If the brass mouthpiece is placed too high on the upper lip in the interior embouchure, a small aperture or opening through which the air must flow will be created and only a small portion of the bottom lip will vibrate, thus causing a very small tone and extreme difficulty in performing the high register. An aperture must be found in the interior embouchure that will permit both a large sound and playing throughout the full register.

Although the importance of the interior embouchure is known to be the key to the success or failure of a brass player, heretofore brass players with interior embouchure problems, such as those discussed above and others, have found it extremely difficult to discover solutions to these problems because they are unable to ascertain what transpires on the inside of the brass mouthpiece where the interior embouchure functions. Up to now the trial and error method has been the only means available to help brass players with interior embouchure problems. It is understood that at one time a mouthpiece rim with a stem on it was proposed for brass instrument instructors to observe a student's interior embouchure but the device was not successful.

It is the object of my invention to provide a means for setting the interior embouchure of brass players and to correct faults therewith.

SUMMARY OF THE INVENTION

According to the invention a training device for developing the proper interior embouchure of brass instrument players comprises: a brass instrument training mouthpiece which provides visual observation of the interior embouchure from the rear of the training mouthpiece when the player's lips are applied to the front thereof; a body member having a reflective surface; and means for mounting said training mouthpiece to said body member in spaced relation to the reflective surface with the rear of the training mouthpiece facing the reflective surface such that a player placing his lips to the front of the mouthpiece may observe the interior embouchure as reflected in the reflective surface. The training mouthpiece may take the form of an annular member having the dimensions of the rim of a selected brass instrument mouthpiece portion which permits observation of the interior embouchure in the reflective surface of the body member.

As an additional aspect of the invention, the training device may be provided with an opaque planar guard member extending laterally from the training mouthpiece which obscures observation of the exterior embouchure of the player and therefore concentrates the player's attention on the interior embouchure.

DESCRIPTION OF THE PREFERRED EMBODIMENT

Figure 1:
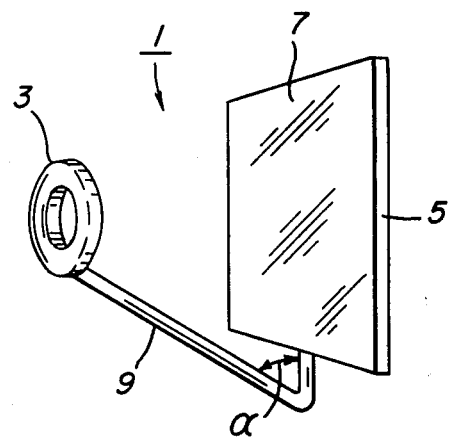
FIG. 1 is a perspective view of a training device according to the invention for developing the proper interior embouchure of brass instrument players.

As illustrated in FIG. 1 my training device for developing the interior embouchure of brass players identified by the general reference character 1, comprises an annular member 3 which may be the rim cut from a brass instrument mouthpiece or the equivalent, and a planar body member 5 provided with a reflective surface 7 such as a mirror or the like. The mouthpiece rim 3 is mounted in spaced relation parallel to the plane of the reflective surface 7 by a rod 9. As shown, the rod 9 may be secured to the rear of the body member 5 and bent at an acute angle $\alpha$ such that the mouthpiece rim 3 is centered above the reflective surface. Typically, the rod may be of such a length and be bent at such an angle $\alpha$ that the mouthpiece 3 is fixed at about 3 inches from the reflective surface.

Figure 2:
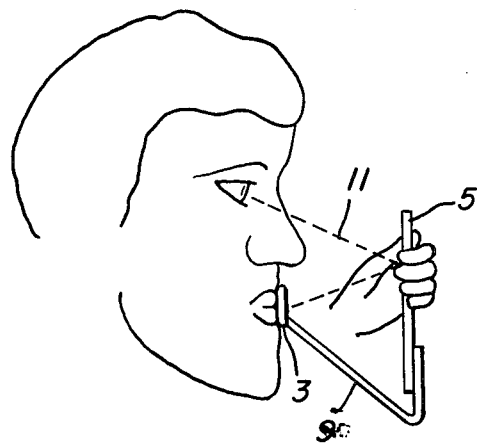
FIG. 2 is a schematic diagram illustrating the use of the device of FIG. 1 by a brass player.

The brass player in utilizing the invention holds the device by the body member 5 and places the lips against the mouthpiece rim 3 as shown in FIG. 2. The player may then observe his or her interior embouchure by looking into the reflective surface along the sight line 11. With this arrangement, the player may then visually observe the interior embouchure and make corrections. With continued use of this device, the player can develop the feel for the proper interior embouchure to be used when playing his selected instrument.

Figure 4:
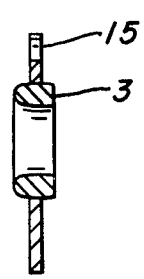
FIG. 4 is a vertical sectional view through the training mouthpiece and guard of FIG. 3 taken along the line IV-IV.
Figure 3:
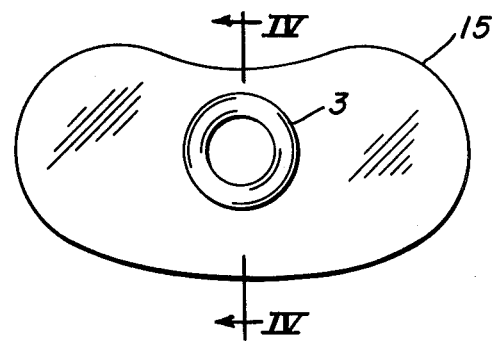
FIG. 3 is a front elevation view of my training device according to the invention equipped with a guard for obscuring the exterior embouchure.

FIGS. 3 and 4 illustrate the use of a guard in the form of a planar member 15 extending laterally from the mouthpiece rim 3. This guard member may be press-fitted over the mouthpiece rim 3 as shown or held in place by a set screw, or by other suitable securing means. With this arrangement the player's exterior embouchure, that is those organs outside the mouthpiece, are obscured from view as the player gazes into the reflective surface 7 of the training device and hence his attention is focused solely on the interior embouchure. This guard may be easily removed so that the player may observe both the interior and the exterior embouchure when desired.

From the above description it is clear that with my invention the development of the proper interior embouchure of brass instrument players is not left to trial and error as has been the practice to date but may be directly observed, corrected and practiced by the player. It will also be apparent that at the same time that the student is observing the interior embouchure in the reflective surface, an instructor may directly observe the interior embouchure by facing the student.

While certain forms of my invention have been specifically disclosed herein, it is to be understood that my invention is not to be limited thereby but is to be given the full scope of the appended claims.

I claim as my invention:

1. A training device for developing the proper interior embouchure of brass instrument players comprising:

a brass instrument training mouthpiece in the form of an annular member having the dimensions of the rim of a selected brass instrument mouthpiece which provides visual observation of the interior embouchure from the rear of the training mouthpiece when the player's lips are applied to the front thereof;

a body member having a planar reflective surface; and means for mounting said training mouthpiece to said body member in unobstructed spaced relation with said rim parallel and in line with the planar reflective surface and with the rear of the training mouthpiece facing the planar reflective surface such that a player placing his lips to the front of the mouthpiece may observe the full interior embouchure as reflected in the reflective surface.

2. The training device of claim 1 including an opaque planar guard member extending laterally from the training mouthpiece which obscures observation of the exterior embouchure of the player and therefor concentrates the player's attention on the interior embouchure.

* * * * *